United States Patent Office 3,454,224
Patented July 8, 1969

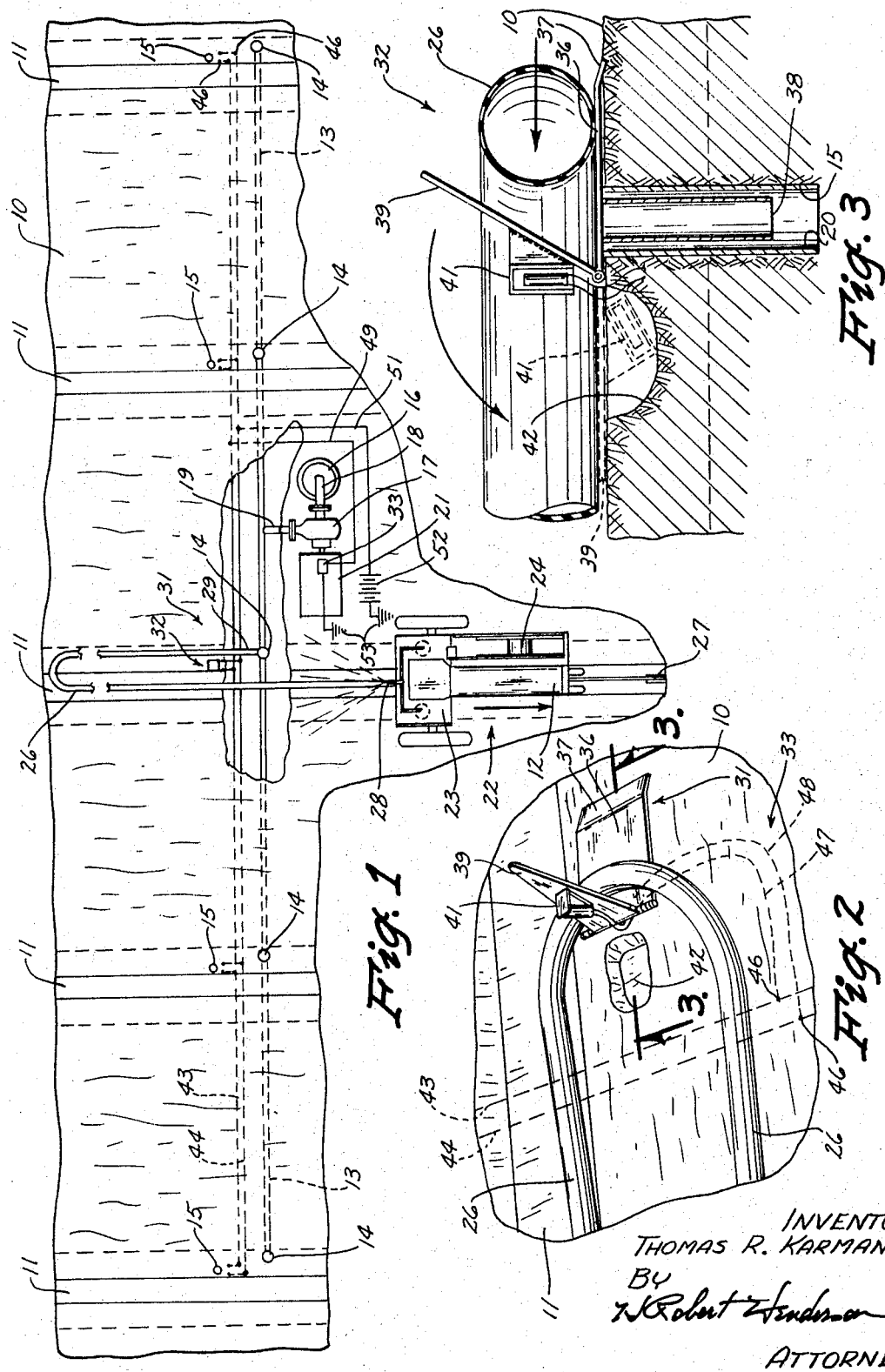

3,454,224
AUTOMATIC SHUTOFF DEVICE FOR A TRAVELING IRRIGATION SPRINKLER APPARATUS
Thomas R. Karmann, Omaha, Nebr., assignor to Valmont Industries, Inc., Valley, Nebr.
Filed Oct. 31, 1967, Ser. No. 679,490
Int. Cl. B05b 3/18
U.S. Cl. 239—184                                                  7 Claims

ABSTRACT OF THE DISCLOSURE

This invention pertains to an automatic shutoff device for use with a self-propelled traveling irrigation sprinkler apparatus which is connected by a hose to a source of water under pressure. The device includes a mercury switch, or the like, mounted on a movable arm hingedly connected to a plate disposed on the surface of the ground in the path of travel of the hose. The switch is electrically connected to a valve, such as a solenoid or a magnetic relay, which is operable to stop the engine that powers the pump providing pressure to the water source.

BACKGROUND OF THE INVENTION

Field of the invention

This invention relates generally to a sprinkling apparatus and more particularly to an automatic shutoff device for a self-propelled traveling irrigation sprinkler apparatus useable for agricultural irrigation of fields and the like.

Description of the prior art

In recent years, more and more emphasis has been placed on the successful development of sprinkler apparatus for particular use in the irrigation of agricultural fields. Replacing the conventional fixed sprinkler arrangement of a plurality of pipe sections coupled together have been several successful portable apparatus.

Among these apparatus is a traveling irrigation apparatus which is self-propelled in a field so as to obviate the need for an attendant, and the rate of movement of which is in keeping with that rate most suitable for sprinkling, and which sprinkler utilizes the water for both propelling itself and irrigation purposes. The apparatus utilizes a flexible conduit, or hose, to convey a source of water under pressure from a fixed position to the movable spraying heads during operation and to a hydraulic motor for operating the structure on which the spraying heads are carried.

In operation, a self-propelled sprinkler apparatus is connected by a hose to a water source under pressure with the hose extended away from the water source. The water is then turned on and the apparatus slowly works its way toward the water source on a predetermined course as it irrigates the land within reach of its sprinkler heads. As the apparatus approaches the water source it pulls the hose behind it, thus causing the hose to loop back toward the end connected to the source. The apparatus passes the water source and continues on until it reaches a point wherein the hose is extended therefrom directly back to the water source. Continued travel by the apparatus would either cause the hose to part or damage either the connection at the apparatus or the water source, thus stopping the flow of water thereto.

Several different stop devices have been incorporated into the apparatus for stopping the apparatus upon reaching the end of the field, however none of the known type have proved completely successful.

For example, one stop device, as described in U.S. Patent No. 3,085,751, utilizes an upstanding stop plate driven into the ground at the end of the path of travel. Slideably mounted on the apparatus is a rod which projects forward therefrom, which upon coming into contact with the stop plate shuts off a valve, thus stopping the flow of water to the apparatus. It has been found that during the irrigation process the ground becomes wet and the stop plate either falls over or is pushed over by the rod without stopping the flow of water. Also, as occasionally occurs, this apparatus wanders from its predetermined path of travel and upon reaching its maximum length of travel; as prescribed by the length of hose, does not find a stop plate to shut off the valve. Furthermore, if the rod should become misaligned or if the valve should stick the device fails to protect the apparatus.

As revealed in U.S. Patent No. 3,235,009, in FIGS. 19 and 21, the stop device has been incorporated with the water source. Thus as the apparatus reaches the end of its path of travel, the hose, tied in with a rotatable valve mounted on the water source, swings around the water source and turns the valve. Considerable stresses are placed on the hose under this procedure with ultimate failure possibly occurring in the hose because of the tension placed thereon. Furthermore when the apparatus stops, the hose is held in tension thus making it most difficult to disconnect it from either the water source or the apparatus. As the usual method of disconnection is at the water source, to enable the apparatus to reel in the hose, the hose must be manually pulled toward the water source to relieve the tension before it can be disconnected. A considerable length of hose is often utilized in this method of irrigating, and when partially filled with water, a tremendous force is necessary to move the hose for releasing this tension. In the event that the hose can be disconnected without relieving the tension, the whipping action of the hose upon disconnection, as it assumes its natural position, could easily cause severe injury to the operator and/or possible destruction to crops located nearby.

Not every field has the same configuration, that is a field may not be substantially rectangular or there may be areas of the field which do not require irrigation. An apparatus utilizing the latter of the two above described shut off devices, would necessarily require different lengths of hose for each different length of crop row or an attendant would be required to stop the flow of water upon completion of each irrigation cycle, thus defeating one of the primary objectives of this type of apparatus.

SUMMARY OF THE INVENTION

It is therefore an object of this invention to provide a stop device or shut off device which stops the flow of water at the appropriate time without the attention of an attendant.

In accomplishing this objective, this invention utilizes a shut off device which is wired to the engine supplying the power necessary to provide water under pressure. The device is disposed in the path of the loop of the hose, and as the hose passes over the device it effectively stops the flow of water by breaking the electrical circuit of the engine or by stopping the flow of fuel to the engine.

As each series of crop rows irrigated by one complete travel of the apparatus may be of different length, it is only necessary to predetermine the spot which the loop traverses when the apparatus is at the end of the row and install the device at that spot. Each location of that spot, relative to the water source, can thus be easily established, and furthermore be at varying distances from the water source.

It is another object of this invention to provide a shut off device which does not require an extremely complicated valving device mounted on the apparatus that shuts off the water supply, upon coming into contact with an object placed at the end of the row of travel.

A further object of this invention is the provision of a shut off device for use with a self-propelled traveling irrigation apparatus which does not require the attention of an attendant upon the completion of an irrigation cycle.

Yet another object of this invention is to provide a shut off device that can be installed at any location adjacent to or apart from the engine, supplying power to pressurize the water, which effectively stops the flow of water automatically when the apparatus reaches a predetermined distance from the water source.

Yet a further object of this invention is the provision of an automatic shut off device which effectively prevents undue stresses from being placed on the hose or on its connecting joints with either or both the water source and the apparatus.

Another object of this invention is the provision of a shut off device for a traveling irrigation sprinkler apparatus which is operated by the loop of the hose as it passes thereover, wherein the apparatus will not only stop sprinkling but will also stop traveling at a predetermined point.

Still another object of this invention is to provide a shut off device for an automatic irrigation sprinkler apparatus that eliminates the hazards of injury to an attendant and/or damage to the crop by stopping the flow of water before the crop has been flooded and before the hose has been placed in such tension that it either parts or makes it extremely dangerous to be disconnected from the water source or apparatus.

A still further object of this invention is to provide a shut off device for an automatic self-propelled irrigation apparatus which is economical to manufacture, rugged in contsruction and extremely effective in use.

These objects, and other features and advantages of this invention will become more readily apparent upon reference to the following description when taken in conjunction with the accompanying drawings.

BRIEF DESCRIPTION OF THE DRAWINGS

FIG. 1 is a fragmentary top plan view of a field with a traveling irrigation sprinkler apparatus operating thereon and showing the shut off device of this invention installed therewith;

FIG. 2 is a fragmentary perspective view of the device of this invention; and

FIG. 3 is a sectional view in side elevation as taken along the lines 3—3 in FIG. 2.

DESCRIPTION OF THE PREFERRED EMBODIMENTS

Referring now to the drawings, there is shown in FIG. 1 a fragmentary view of an agricultural field 10, having a plurality of spaced apart preformed furrows 11 disposed laterally thereon. The furrows 11, formed by means conventionally used for such purpose, are provided to guide a tractor 12 as described hereinafter. An underground fluid pipeline 13 is longitudinally disposed in the field, at approximately the longitudinal center of the furrows 11. At predetermined locations substantially adjacent each furrow 11, an outlet valve 14 is fluidly connected to the pipeline 13, and is adapted, upon being opened, to allow the contents of the pipeline to flow therefrom. Adjacent each furrow 11 and on the same side of the furrow as the valve 14, a hole 15 is drilled into the ground at a predetermined distance from the pipeline 13. Implanted in each of the holes 15 is a short pipe 20 (FIG. 3) having the upper end thereof substantially flush with the surface of the ground. A well 16 (FIG. 1), or source of water disposed adjacent to the pipeline 13, is fluidly connected to the inlet side of a pump 17 by a pipe 18. The outlet side of the pump 17 is connected to the pipeline 13 by a second pipe 19. Operatively connected to the pump 17 is a power unit 21, or engine, adapted to drive the pump for the purpose of increasing the pressure of the water passing therethrough.

A self-propelled traveling irrigation sprinkler apparatus 22 (FIG. 1) is depicted under operating conditions in the field 10. The apparatus 22 includes the wheeled tractor 12, or the like, a sprinkler and propelling unit 23 detachably mounted on the tractor which is operable to power the tractor and irrigate the field during the irrigation process, a reel 24 rotatably mounted on the tractor and adapted to carry a hose 26, and a furrow follower 27 connected to the front of the tractor 12 for guiding the tractor during the irrigation process. The hose 26, in this instance is shown disposed behind the tractor 12 with one end 28 thereof connected to the sprinkler and propelling unit 23 and with the other end 29 thereof connected to one of the outlet valves 14. It will be observed in FIG. 1 that a portion of the hose 26 is disposed in the furrow 11 with the remaining portion disposed adjacent thereto.

The automatic shutoff device of this invention is indicated generally at 31 in FIG. 1, and includes a switching element 32 disposed in the line of travel of the hose 26 and adjacent to the furrow 11, a control element 33 operatively connected to the power unit 21, and an electrical system interconnected between the switching element 32 and the control element 33.

The switching element 32 (FIGS. 2 and 3) includes a plate 36 horizontally disposed on the surface of the field 10 over the hole 15. Integrally formed and projecting rearwardly from the plate is a depending ramp 37, with the outward end thereof adapted to be embedded in the ground. Secured, as by welding, to the underside of the plate is a depending post 38 which is adapted to be removably disposed in one of the pipes 20, thus positioning the plate 36 thereover. Hingedly connected to the front end of the plate 36 is a triangularly shaped arm 39 movable from an upright position, as shown in full line in FIG. 3, to a substantially horizontal position, as shown in broken line. A mercury switch 41, or the like, is secured to the underside of the arm 39, whereupon movement of the arm from an upright position to a horizontal position causes the switch to operatively move from a closed position to an open position, thus breaking electrical contact between the poles of the switch 41. Although not absolutely necessary, a pit 42 is dug in the ground immediately forward of the plate, as shown in FIG. 3, to allow the depending mercury switch 41 to drop below the surface of the ground when the arm is in a horizontal position, thus providing a substantially level surface across the plate 36 and the projecting arm 39.

The electrical system, previously mentioned, includes a pair of parallel, underground disposed wires 43 and 44 (FIG. 1) laid adjacent to and parallel with the pipeline 13. At each furrow 11, a terminal 46 is provided on each wire 43 and 44 (FIG. 2). The terminal 46 on wire 43 is connected by a wire 47 to one of the poles of the mercury switch 41, and the terminal 46 on the wire 44 is connected to the other pole of the switch 41 by a wire 48. Wire 43 (FIG. 1) is connected by a wire 49 to the control element 33, and wire 44 is connected by a wire 51 to a source of power 52. Both the control element 33 and the power source 52 are electrically connected to a ground 53, thus completing a circuit from a ground 53 through the source of power 52 to the mercury switch through wires 51 and 44 and from the mercury switch to the control element 33 through the wires 43 and 49 and to ground at 53.

The control element 33 (FIG. 1) comprises either a magnetic relay, a solenoid valve or the like. In event the power unit 21 is an electric motor, gasoline or natural gasoline engine, or the like, a magnetic relay is interconnected to the electrical system of the engine 21, thus when the switch 41 (FIG. 3) is tripped, or moves from the horizontal to the vertical with movement of the arm 39, electrical contact is broken and the power unit 21 shuts down.

If the power unit 21 (FIG. 1) is a diesel engine, or the like, the control element 33 comprises a solenoid valve, or the like, interconnected in the fuel line of the engine. When the switch 41 (FIG. 3) trips, electrical contact is broken and the solenoid valve closes, thus the fuel line is closed and shuts off the supply of fuel to the engine.

In operation the self-propelled traveling irrigation sprinkler apparatus 22 with the hose mounted on the reel is driven, preferably to the longitudinal center of the field and immediately adjacent to one of the valves 14. The valve 14 has a quick hose disconnect (not shown) mounted thereon, to which the end 29 of the hose 26 is connected. The tractor 12 is then driven to the end of the furrow 11 with the hose 26 unreeling along the side of the furrow 11. At the end of the furrow the tractor is positioned with the furrow follower 27 disposed in the furrow, and the tractor facing the valve 14. The other end 28 of the hose is connected to a quick hose disconnect (not shown) located on the sprinkler and propelling unit 23.

The switching element 32 (FIG. 2) is mounted, with the depending post 38 disposed in the pipe 20. The mercury switch connected to the wires 47 and 48 is electrically connected to the wires 43 and 44 at the terminals 46. The arm 39 is moved to an upright position thus completing the circuit between the power source 52 and the control element 33. The power unit 21 is engaged and the pump commences to pump the water from the water source 16 into the pipeline 13. Upon opening the valve 14 the water courses through the hose into the sprinkling and propelling unit 23 thus propelling the tractor along the furrow 11 toward the opposite side of the field, with the furrow follower guiding the tractor and maintaining it on course over the furrow 11. The tractor pulls the hose 26 along and continues its forward movement until it approaches the opposite end of the field at which time the loop in the hose comes in contact with the ramp 37. Continued movement of the tractor causes the hose 26 to slide up the ramp 37 onto the plate 36, as best shown in FIG. 3. As the hose 26 moves across the plate 36 it causes the arm 39 to move from the upright position to a horizontal position thus breaking electrical contact in the switch 41 and shutting down the power unit 21.

It should be noted that the switching element 32 (FIG. 1) is located upstream from the valve 14. This arrangement is required to enable the power unit 21 to shut down and the tractor 12 to cease its forward movement before the hose 26 is stretched between the tractor 12 and the valve 14, thus eliminating tension in the hose and permitting easy disconnection of the hose from the valve 14.

Upon reaching the downstream end of the furrow 11, the hose 26 is readily disconnected from the valve 14 and the sprinkler and propelling unit 23 and wound upon the reel 24. The tractor is then driven to the center of the field 10 adjacent another valve 14 and the above cycle is recommenced.

As often occurs, the field may have an area along one side thereof and on only one or two furrows which is not seeded or which does not require irrigation, i.e. a grove of trees, irregular shaped field, or a house. In this instance the switching element 32 would be located upstream from the pipeline 13, that is, closer to the end of the furrow 11 at which point the tractor is first positioned before it starts down the furrow, thus causing the distance traveled by the tractor to conform to the area of the field which is to be irrigated.

Although a preferred embodiment of this invention has been disclosed and described hereinbefore, it is to be remembered that various modifications and alternate constructions can be made thereto without departing from the true spirit and scope of the invention as defined in the appended claims.

I claim:

1. An automatic shutoff device for use with a traveling irrigation sprinkler apparatus having a self-propelled sprinkler fluidly connected by a hose to a water pump operated by an engine, the device comprising:
   switch means disposed in the path of travel of the hose, said switch means movable from a first position to a second position in response to movement of the hose into engagement with said switch means; and
   valve means electrically connected to said switch means and operatively connected to the engine; said valve means operable when said switch means is in said first position to allow the engine to operate, and operable when said switch means is in said second position to shut off the engine.

2. An automatic shutoff device as defined in claim 1, wherein said switch means includes an arm, said arm movable from an upright position to a substantially horizontal position by the action of the hose, and a switch operatively connected to said arm, whereupon movement of said arm from said upright position to said horizontal position causes said switch to move from a closed position to an open position.

3. An automatic shutoff device as defined in claim 2, and further wherein said switch means includes a plate adapted to be disposed on the surface of the ground and wherein said arm is hingedly connected to said plate.

4. An automatic shutoff device as defined in claim 3, wherein said switch is a mercury switch which in said closed position maintains a closed circuit to said valve means and which in said open position opens said circuit to said valve means.

5. An automatic shutoff device as defined in claim 4, wherein said switch is secured to said arm.

6. An automatic shutoff device as defined in claim 5, wherein said plate includes a depending post secured to the underside thereof adapted to be driven into the ground for securing said underside of said plate in juxtaposition with the ground in the path of the hose.

7. An automatic shutoff device as defined in claim 5, and further wherein said switch means includes a pipe adapted to be implanted in a vertical position in the ground in a predetermined position, and said plate includes a depending post secured thereto adapted to be removably insertable in said pipe.

References Cited

UNITED STATES PATENTS

| | | | |
|---|---|---|---|
| 2,602,696 | 8/1952 | Salatin | 239—192 |
| 2,880,937 | 4/1959 | King | 239—184 |
| 3,085,751 | 4/1963 | Warrick et al. | 239—191 |
| 3,235,009 | 2/1966 | Nelson | 239—184 |
| 3,317,143 | 5/1967 | Turner | 239—191 |

EVERETT W. KIRBY, *Primary Examiner.*

U.S. Cl. X.R.

239—191